(12) United States Patent
Dardas et al.

(10) Patent No.: US 10,745,145 B2
(45) Date of Patent: Aug. 18, 2020

(54) CONTAMINANT REMOVAL FOR CATALYTIC FUEL TANK INERTING SYSTEM

(71) Applicant: HAMILTON SUNDSTRAND CORPORATION, Charlotte, NC (US)

(72) Inventors: Zissis A. Dardas, Worcester, MA (US); Sean C. Emerson, Broad Brook, CT (US); Catherine Thibaud, South Windsor, CT (US); Tianli Zhu, Glastonbury, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 145 days.

(21) Appl. No.: 15/849,165

(22) Filed: Dec. 20, 2017

(65) Prior Publication Data
US 2019/0185175 A1   Jun. 20, 2019

(51) Int. Cl.
*B64D 37/32* (2006.01)
*B01J 23/38* (2006.01)
(Continued)

(52) U.S. Cl.
CPC ............. *B64D 37/32* (2013.01); *B01D 53/04* (2013.01); *B01D 53/0438* (2013.01);
(Continued)

(58) Field of Classification Search
CPC .... B64D 37/32; B64D 37/02; B01D 53/8687; B01D 53/8609; B01D 53/8671; B01D 53/8678; B01D 53/04; B01D 53/8668; B01D 53/0438; B01D 2259/40086; B01D 2255/2047; B01D 2251/11; B01D 2257/302; B01D 2255/2092; B01D 2255/705; B01D 2257/70; B01D 2251/208; B01D 2253/1122; B01D 2251/102; B01D 2255/20715; B01D 2259/4575;
(Continued)

(56) References Cited

U.S. PATENT DOCUMENTS 5,904,190 A * 5/1999 Patel .................. A62C 3/06
141/198
7,628,965 B2  12/2009 Johnson et al.
(Continued)

FOREIGN PATENT DOCUMENTS

WO    2017100617 A1   6/2017

OTHER PUBLICATIONS

European Search Report dated Apr. 25, 2019 cited in Application No. 18213211.8, 7 pgs.

*Primary Examiner* — Anthony J Zimmer
(74) *Attorney, Agent, or Firm* — Cantor Colburn LLP

(57) ABSTRACT

A fuel tank inerting system is disclosed. The system includes a fuel tank and a catalytic reactor with an inlet, an outlet, a reactive flow path between the inlet and the outlet, and a catalyst on the reactive flow path. The catalytic reactor is arranged to receive fuel from a fuel flow path in operative communication with the fuel tank and oxygen from an oxygen source, and to catalytically react a mixture of the fuel and oxygen along the reactive flow path to generate an inert gas. An inert gas flow path provides inert gas from the catalytic reactor to the fuel tank. An adsorbent is disposed along the fuel flow path or along the reactive flow path.

10 Claims, 3 Drawing Sheets

(51) Int. Cl.
    *B01J 20/06*     (2006.01)
    *B01J 20/04*     (2006.01)
    *B01J 20/22*     (2006.01)
    *B01J 20/34*     (2006.01)
    *B01D 53/04*     (2006.01)
    *B01D 53/86*     (2006.01)
    *B64D 37/02*     (2006.01)

(52) U.S. Cl.
CPC ..... *B01D 53/8609* (2013.01); *B01D 53/8668* (2013.01); *B01D 53/8671* (2013.01); *B01D 53/8678* (2013.01); *B01D 53/8687* (2013.01); *B01J 20/041* (2013.01); *B01J 20/06* (2013.01); *B01J 20/226* (2013.01); *B01J 20/3425* (2013.01); *B01J 20/3433* (2013.01); *B01J 20/3458* (2013.01); *B01J 20/3483* (2013.01); *B01J 23/38* (2013.01); *B64D 37/02* (2013.01); *B01D 2251/102* (2013.01); *B01D 2251/11* (2013.01); *B01D 2251/208* (2013.01); *B01D 2253/1122* (2013.01); *B01D 2253/1124* (2013.01); *B01D 2253/204* (2013.01); *B01D 2255/10* (2013.01); *B01D 2255/207* (2013.01); *B01D 2255/209* (2013.01); *B01D 2255/2047* (2013.01); *B01D 2255/2065* (2013.01); *B01D 2255/2092* (2013.01); *B01D 2255/20707* (2013.01); *B01D 2255/20715* (2013.01); *B01D 2255/20746* (2013.01); *B01D 2255/20753* (2013.01); *B01D 2255/20761* (2013.01); *B01D 2255/705* (2013.01); *B01D 2257/104* (2013.01); *B01D 2257/302* (2013.01); *B01D 2257/70* (2013.01); *B01D 2257/7022* (2013.01); *B01D 2259/40083* (2013.01); *B01D 2259/40086* (2013.01); *B01D 2259/40088* (2013.01); *B01D 2259/4575* (2013.01)

(58) Field of Classification Search
CPC ........ B01D 2257/104; B01D 2255/209; B01D 2255/20753; B01D 2255/2065; B01D 2259/40088; B01D 2255/20761; B01D 2255/20746; B01D 2255/20707; B01D 2255/207; B01D 2259/40083; B01D 2253/204; B01D 2255/10; B01D 2253/1124; B01D 2257/7022; B01J 20/3433; B01J 20/3425; B01J 20/3458; B01J 20/3483; B01J 20/226; B01J 20/041; B01J 20/06; B01J 23/38
See application file for complete search history.

(56) References Cited

U.S. PATENT DOCUMENTS

| | | | |
|---|---|---|---|
| 7,694,916 B2 | 4/2010 | Limaye et al. | |
| 7,815,148 B2 | 10/2010 | Kwok | |
| 7,896,292 B2 | 3/2011 | Limaye et al. | |
| 7,905,259 B2 | 3/2011 | Johnson et al. | |
| 9,364,698 B2 | 6/2016 | Wagner | |
| 2006/0169142 A1* | 8/2006 | Rode | B01D 53/02 96/129 |
| 2006/0243859 A1* | 11/2006 | Lessi | A62B 7/14 244/118.5 |
| 2007/0175798 A1 | 8/2007 | Fokema et al. | |
| 2008/0107571 A1 | 5/2008 | Johnson et al. | |
| 2012/0070353 A1 | 3/2012 | Trukhan et al. | |
| 2013/0180884 A1 | 7/2013 | Minoux et al. | |
| 2013/0255493 A1* | 10/2013 | Gupta | B64D 37/32 95/143 |
| 2014/0116249 A1* | 5/2014 | Evosevich | B01D 63/02 95/47 |
| 2014/0208943 A1* | 7/2014 | Gupta | B64D 37/32 95/14 |
| 2015/0314229 A1* | 11/2015 | Johnson | B01D 19/0026 422/187 |
| 2016/0201983 A1* | 7/2016 | Sharma | B01D 53/225 95/11 |
| 2016/0206995 A1 | 7/2016 | Rugg et al. | |
| 2016/0369177 A1 | 12/2016 | Finnerty et al. | |
| 2017/0015433 A1 | 1/2017 | Thibaud | |
| 2017/0144128 A1 | 5/2017 | Carrion et al. | |
| 2017/0333842 A1 | 11/2017 | Robinson et al. | |

\* cited by examiner

CONTAMINANT REMOVAL FOR CATALYTIC FUEL TANK INERTING SYSTEM

BACKGROUND

The subject matter disclosed herein generally relates to fuel handling systems, and more particularly to fuel tank inerting systems such as used on aircraft.

It is recognized that fuel vapors within fuel tanks become combustible in the presence of oxygen. An inerting system decreases the probability of combustion of flammable materials stored in a fuel tank by maintaining a chemically non-reactive or inert gas, such as nitrogen-enriched air, in the fuel tank vapor space, also known as ullage. Three elements are required to initiate and sustain combustion: an ignition source (e.g., heat), fuel, and oxygen. Combustion may be prevented by reducing any one of these three elements. If the presence of an ignition source cannot be prevented within a fuel tank, then the tank may be made inert by: 1) reducing the oxygen concentration, 2) reducing the fuel concentration of the ullage to below the lower explosive limit (LEL), or 3) increasing the fuel concentration to above the upper explosive limit (UEL). Many systems reduce the risk of combustion by reducing the oxygen concentration by introducing an inert gas such as nitrogen-enriched air (NEA) to the ullage, thereby displacing oxygen with a mixture of nitrogen and oxygen at target thresholds for avoiding explosion or combustion.

It is known in the art to equip aircraft with onboard inert gas generating systems, which supply nitrogen-enriched air to the vapor space (i.e., ullage) within the fuel tank. The nitrogen-enriched air has a substantially reduced oxygen content that reduces or eliminates combustible conditions within the fuel tank. Onboard inert gas generating systems typically use membrane-based gas separators. Such separators contain a membrane that is permeable to oxygen and water molecules, but relatively impermeable to nitrogen molecules. A pressure differential across the membrane causes oxygen molecules from air on one side of the membrane to pass through the membrane, which forms oxygen-enriched air (OEA) on the low-pressure side of the membrane and NEA on the high-pressure side of the membrane. The requirement for a pressure differential necessitates a source of compressed or pressurized air. Bleed air from an aircraft engine or from an onboard auxiliary power unit can provide a source of compressed air; however, this can reduce available engine power and also must compete with other onboard demands for compressed air, such as the onboard air environmental conditioning system and anti-ice systems. Moreover, certain flight conditions such as during aircraft descent can lead to an increased demand for NEA at precisely the time when engines could be throttled back for fuel savings so that maintaining sufficient compressed air pressure for meeting the pneumatic demands may come at a significant fuel burn cost. Additionally, there is a trend to reduce or eliminate bleed-air systems in aircraft; for example Boeing's 787 has a no-bleed systems architecture, which utilizes electrical systems to replace most of the pneumatic systems to improve fuel efficiency, as well as reduce weight and lifecycle costs. Other aircraft architectures may adopt low-pressure bleed configurations where engine design parameters allow for a bleed flow of compressed air, but at pressures less than the 45 psi air (unless stated otherwise, "psi" as used herein means absolute pressure in pounds per square inch, i.e., psia) that has been typically provided in the past to conventional onboard environmental control systems. A separate compressor or compressors can be used to provide pressurized air to the membrane gas separator, but this undesirably increases aircraft payload, and also represents another onboard device with moving parts that is subject to maintenance issues or device failure.

BRIEF DESCRIPTION

A fuel tank inerting system is disclosed. The system includes a fuel tank and a catalytic reactor comprising an inlet, an outlet, a reactive flow path between the inlet and the outlet, and a catalyst on the reactive flow path. The catalytic reactor is arranged to receive fuel from a fuel flow path in operative communication with the fuel tank and oxygen from an oxygen source, and to catalytically react a mixture of the fuel and oxygen along the reactive flow path to generate an inert gas. An inert gas flow path provides inert gas from the catalytic reactor to the fuel tank. An adsorbent is disposed along the fuel flow path or along the reactive flow path.

Also disclosed is a method of managing a fuel tank vapor space, comprising contacting fuel with an adsorbent, reacting the fuel with oxygen in the presence of a catalyst to produce an inert gas, and delivering the inert gas to the fuel tank vapor space.

In some embodiments, the method further includes heating the adsorbent to regenerate the adsorbent.

In any one or combination of the foregoing embodiments, the method further includes oxidizing the adsorbent to regenerate the adsorbent.

In any one or combination of the foregoing embodiments, the adsorbent comprises a transition metal oxide. In some embodiments, the transition metal oxide comprises an oxide of manganese, copper, cobalt, magnesium, nickel, indium, or combinations comprising any of the foregoing.

In any one or combination of the foregoing embodiments, the adsorbent comprises a metal organic framework.

In any one or combination of the foregoing embodiments, the metal organic framework comprises a transition metal or transition metal oxide. In some embodiments, the transition metal or oxide of a transition metal is selected from manganese, copper, cobalt, magnesium, nickel, indium, or combinations comprising any of the foregoing.

In any one or combination of the foregoing embodiments, the system further includes a thermal connection between the adsorbent and a heat source for regenerating the adsorbent.

In any one or combination of the foregoing embodiments, the system further includes a fluid connection between the adsorbent and an oxidizing source for regenerating the adsorbent.

In any one or combination of the foregoing embodiments, the adsorbent is disposed on the fuel flow path.

In any one or combination of the foregoing embodiments, the adsorbent is disposed on the reactive flow path.

In any one or combination of the foregoing embodiments, the catalyst comprises a transition metal oxide as said adsorbent. In some embodiments, the catalyst further comprises a noble metal catalyst.

In any one or combination of the foregoing embodiments, the catalyst comprises a noble metal catalyst.

Also disclosed is a fueled vehicle including the fuel tank inerting system according to any one or combination of the foregoing embodiments.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1A:
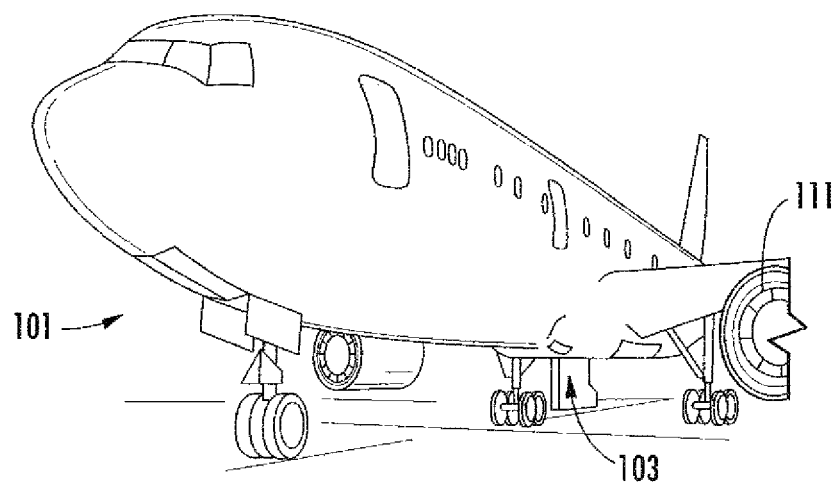
FIG. 1A is a schematic illustration of an aircraft that can incorporate various embodiments of the present disclosure.
Figure 1B:
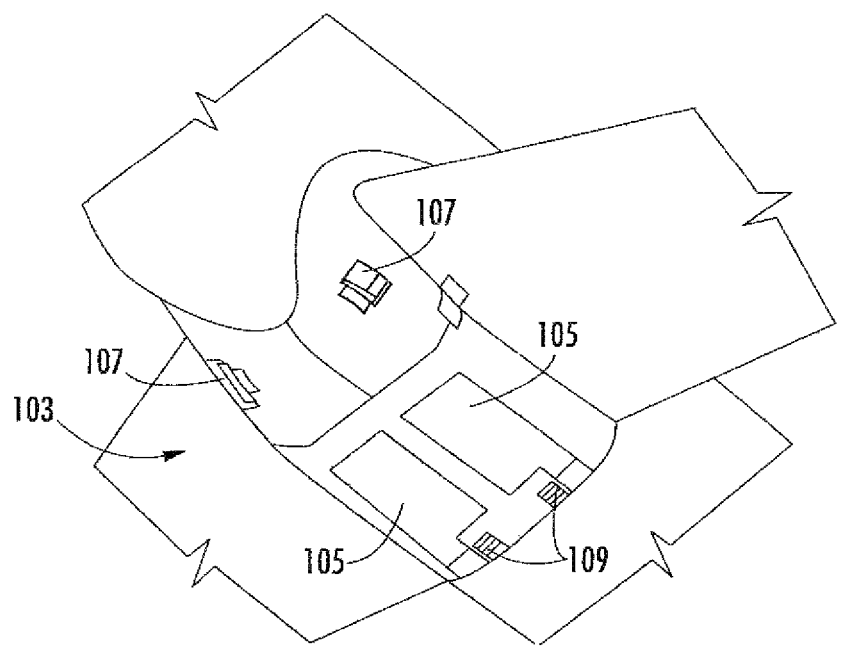
FIG. 1B is a schematic illustration of a bay section of the aircraft of FIG. 1A.

As shown in FIGS. 1A-1B, an aircraft 101 can include one or more bays 103 beneath a center wing box. The bay 103 can contain and/or support one or more components of the aircraft 101. For example, in some configurations, the aircraft 101 can include environmental control systems and/or fuel inerting systems within the bay 103. As shown in FIG. 1B, the bay 103 includes bay doors 105 that enable installation and access to one or more components (e.g., environmental control systems, fuel inerting systems, etc.). During operation of environmental control systems and/or fuel inerting systems of the aircraft 101, air that is external to the aircraft 101 can flow into one or more ram air inlets 107. The outside air may then be directed to various system components (e.g., environmental conditioning system (ECS) heat exchangers) within the aircraft 101. Some air may be exhausted through one or more ram air exhaust outlets 109.

Also shown in FIG. 1A, the aircraft 101 includes one or more engines 111. The engines 111 are typically mounted on wings of the aircraft 101, but may be located at other locations depending on the specific aircraft configuration. In some aircraft configurations, air can be bled from the engines 111 and supplied to environmental control systems and/or fuel inerting systems, as will be appreciated by those of skill in the art.

As noted above, typical air separation modules operate using pressure differentials to achieve desired air separation. Such systems require a high pressure pneumatic source to drive the separation process across the membrane. Further, the hollow fiber membrane separators commonly used are relatively large in size and weight, which is a significant consideration with respect to aircraft (e.g., reductions in volume and weight of components can improve flight efficiencies). Embodiments provided herein can provide reduced volume and/or weight characteristics of air separation modules for aircraft. In accordance with some embodiments of the present disclosure, the typical hollow fiber membrane separator can be replaced by a catalytic system (e.g., $CO_2$ generation system), which can be, for example, smaller, lighter, more durable, and/or more efficient than the typical fiber membrane separators. The catalytic system can be used on any fuel tank system, whether stationary (e.g., a tank farm) or on a vehicle with on-board fuel (i.e., fueled vehicle) such as an aircraft, ship, submarine or other marine vehicle, or land vehicle.

The function of fuel tank flammability reduction systems in accordance with embodiments of the present disclosure is accomplished by reacting a small amount of fuel (e.g., a "first reactant") with a source of gas containing oxygen such as air (e.g., a "second reactant"). The product of the reaction is carbon dioxide and water vapor. The source of the second reactant (e.g., air) can be bleed air or any other source of air containing oxygen, including, but not limited to, high-pressure sources (e.g., engine), bleed air, cabin air, etc. A catalyst material such as a noble metal catalyst is used to catalyze the chemical reaction. The carbon dioxide that results from the reaction is an inert gas that is mixed with nitrogen naturally found in fresh/ambient air, and is directed back within a fuel tank to create an inert environment within the fuel tank, thus reducing the flammability of the vapors in the fuel tank.

As mentioned above, a catalyst is used to catalyze a chemical reaction between oxygen ($O_2$) and fuel to produce carbon dioxide ($CO_2$) and water. The source of $O_2$ used in the reaction can come from any of a number of air sources, including, but not limited to, pneumatic sources on an aircraft that supply air at a pressure greater than ambient. Fuel from the aircraft fuel tank can be vaporized before mixing and reacting with air on the catalyst. The fuel can be heated to promote vaporization of the fuel, such as by using an electric heater, as shown and described in some embodiments of the present disclosure.

Any inert gas species that are present with the reactants (for example, nitrogen) will not react and will thus pass through the catalyst unchanged. In some embodiments, the catalyst can be in a form factor that acts as a heat exchanger. For example, in one non-limiting configuration, a plate fin heat exchanger configuration is employed wherein a hot side of the heat exchanger would be coated with catalyst material. In such arrangement, the cold side of the catalyst heat exchanger can be fed with a cool air source, such as ram air or some other source of cold air. The air through the cold side of the heat exchanger can be controlled such that the temperature of a hot, mixed-gas stream is hot enough to sustain a desired chemical reaction within or at the catalyst. Further, the cooling air can be used to maintain a cool enough temperature to enable removal of heat generated by exothermic reactions at the catalyst.

The catalytic chemical reaction between fuel and air also generates water. Water in the fuel tank can be undesirable. Thus, in accordance with embodiments of the present disclosure, the water from a product gas stream (e.g., exiting the catalyst) can be removed through various mechanisms, including, but not limited to, condensation. The product gas stream can be directed to enter a heat exchanger downstream from the catalyst that is used to cool the product gas stream such that the water vapor condenses out of the product gas stream. The liquid water can then be drained overboard. In some embodiments, an optional water separator can be used to augment or provide water separation from the product stream.

Aircraft fuel tanks are typically vented to ambient pressure. At altitude, pressure inside the fuel tank is very low and is roughly equal to ambient pressure. However, during descent, the pressure inside the fuel tank needs to rise to equal ambient pressure at sea level (or at whatever altitude the aircraft is landing). This change in pressure requires gas entering the tank from outside to equalize with the pressure in the tank. When air from outside enters the tank, water vapor is normally present with it. Water can become trapped in the fuel tank and cause problems. In accordance with embodiments of the present disclosure, to prevent water from entering the fuel tanks, the fuel inerting systems of the present disclosure can repressurize the fuel tanks with dry inert gas that is generated as described above and below. The repressurization can be accomplished by using a flow control valve to control the flow of inert gas into the fuel tank such that a positive pressure is constantly maintained in the fuel tank. The positive pressure within the fuel tank can prevent air from entering the fuel tank from outside during descent and therefore prevent water in the air outside the fuel tank from entering the fuel tank.

Figure 2:
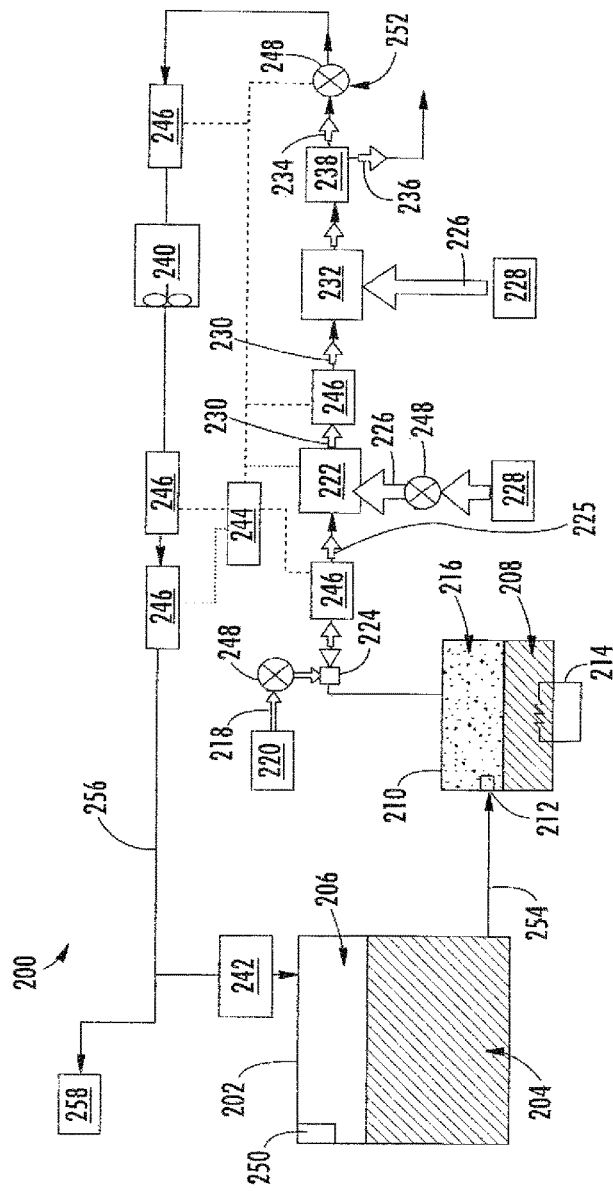
FIG. 2 is a schematic illustration of an example embodiment of a fuel tank inerting system.

FIG. 2 is a schematic illustration of a flammability reduction or inerting system 200 utilizing a catalytic reaction between first and second reactants to produce inert gas in accordance with an embodiment of the present disclosure. The inerting system 200, as shown, includes a fuel tank 202 having fuel 204 therein. As the fuel 204 is consumed during operation of one or more engines, an ullage space 206 forms within the fuel tank 202. To reduce flammability risks associated with vaporized fuel that may form within the ullage space 206, an inert gas can be generated and fed into the ullage space 206.

The inerting system 200 utilizes the catalytic reactor 222 to catalyze a chemical reaction between oxygen (second reactant 218) and fuel vapor (first reactant 216) to produce carbon dioxide-containing for the inert gas (inert gas 234) and water in vapor phase (byproduct 236). The source of the second reactant 218 (e.g., oxygen) used in the reaction can come from any source on the aircraft that is at a pressure greater than ambient, including but not limited to bleed air from an engine, cabin air, high pressure air extracted or bled from an engine, etc. (i.e., any second reactant source 220 can take any number of configurations and/or arrangements). Even non-air oxygen sources can be used, and "air" is used herein as a short-hand term for any oxygen-containing gas. The fuel vapor (first reactant 216) is created by draining a small amount of fuel 204 from the fuel tank 202 (e.g., a primary aircraft fuel tank) into the evaporator container 210. The inerting fuel 208 within the evaporator container 210 is heated using the electric heater 214. In some embodiments, the first reactant 216 (e.g., fuel vapor) is removed from the evaporator container 210 by using the mixer 224 to induce a suction pressure that pulls the first reactant 216 out of the evaporator container 210. The mixer 224, in such embodiments, utilizes the elevated pressure of the second reactant source 220 to induce a secondary flow within the mixer 224 which is sourced from the evaporator container 210. Further, the mixer 224 is used to mix the two gas streams (first and second reactants 216, 218) together to form the mixed reactant stream 225. In other embodiments, the fuel and air can be introduced to the reactor without pre-mixing.

With continued reference to FIG. 2, the mixed reactant stream 225 (e.g., fuel and oxygen or air) is then introduced to the catalytic reactor 222, catalyzing a chemical reaction that transforms the mixed reactant stream 225 (e.g., fuel and air) into the inert gas 234 and the byproduct 236 (e.g., water vapor). It is noted that any inert gas species that are present in the mixed reactant stream 225 (for example, nitrogen from the air) will not react and will thus pass through the catalytic reactor 222 unchanged. In some embodiments, the catalytic reactor 222 is in a form factor that acts as a heat exchanger. For example, one non-limiting configuration may be a plate fin heat exchanger wherein the hot side of the heat exchanger would be coated with the catalyst material. Those of skill in the art will appreciate that various types and/or configurations of heat exchangers may be employed without departing from the scope of the present disclosure. The cold side of the catalyst heat exchanger can be fed with the cooling air 226 from the cool air source 228 (e.g., ram air or some other source of cold air). The air through the cold side of the catalyst heat exchanger can be controlled such that the temperature of the hot mixed reactant stream 225 is hot enough to sustain the chemical reaction desired within the catalytic reactor 222, but cool enough to remove the heat generated by the exothermic reaction, thus maintaining aircraft safety and materials from exceeding maximum temperature limits.

The catalytic reactor 222 can be temperature controlled to ensure a desired chemical reaction efficiency such that an inert gas can be efficiently produced by the inerting system 200 from the mixed reactant stream 225. Accordingly, cooling air 226 can be provided to extract heat from the catalytic reactor 222 to achieve a desired thermal condition for the chemical reaction within the catalytic reactor 222. The cooling air 226 can be sourced from a cool air source 228. A catalyzed mixture 230 leaves the catalytic reactor 222 and is passed through a heat exchanger 232. The heat exchanger 232 operates as a condenser on the catalyzed mixture 230 to separate out an inert gas 234 and a byproduct 236 (e.g., water). A cooling air is supplied into the heat exchanger 232 to achieve the condensing functionality. In some embodiments, as shown, a cooling air 226 can be sourced from the same cool air source 228 as that provided to the catalytic reactor 222, although in other embodiments the cool air sources for the two components may be different. The byproduct 236 may be water vapor, and thus in the present configuration shown in FIG. 2, an optional water separator 238 is provided downstream of the heat exchanger 232 to extract the water from the catalyzed mixture 230, thus leaving only the inert gas 234 to be provided to the ullage space 206 of the fuel tank 202.

A flow control valve 248 located downstream of the heat exchanger 232 and optional water separator 238 can meter the flow of the inert gas 234 to a desired flow rate. An optional boost fan 240 can be used to boost the gas stream pressure of the inert gas 234 to overcome a pressure drop associated with ducting between the outlet of the heat exchanger 232 and the discharge of the inert gas 234 into the fuel tank 202. The flame arrestor 242 at an inlet to the fuel tank 202 is arranged to prevent any potential flames from propagating into the fuel tank 202.

Typically, independent of any aircraft flammability reduction system(s), aircraft fuel tanks (e.g., fuel tank 202) need to be vented to ambient pressure. Thus, as shown in FIG. 2, the fuel tank 202 includes a vent 250. At altitude, pressure inside the fuel tank 202 is very low and is roughly equal to ambient pressure. During descent, however, the pressure inside the fuel tank 202 needs to rise to equal ambient pressure at sea level (or whatever altitude the aircraft is landing at). This requires gas entering the fuel tank 202 from outside to equalize with the pressure in the tank. When air from outside enters the fuel tank 202, water vapor can be carried by the ambient air into the fuel tank 202. To prevent water/water vapor from entering the fuel tank 202, the inerting system 200 can repressurize the fuel tank 202 with the inert gas 234 generated by the inerting system 200. This is accomplished by using the valves 248. For example, one of the valves 248 may be a flow control valve 252 that is arranged fluidly downstream from the catalytic reactor 222. The flow control valve 252 can be used to control the flow of inert gas 234 into the fuel tank 202 such that a slightly positive pressure is always maintained in the fuel tank 202. Such positive pressure can prevent ambient air from entering the fuel tank 202 from outside during descent and therefore prevent water from entering the fuel tank 202.

A controller 244 can be operably connected to the various components of the inerting system 200, including, but not limited to, the valves 248 and the sensors 246. The controller 244 can be configured to receive input from the sensors 246 to control the valves 248 and thus maintain appropriate levels of inert gas 234 within the ullage space 206. Further, the controller 244 can be arranged to ensure an appropriate amount of pressure within the fuel tank 202 such that, during a descent of an aircraft, ambient air does not enter the ullage space 206 of the fuel tank 202.

In some embodiments, the inerting system 200 can supply inert gas to multiple fuel tanks on an aircraft. As shown in the embodiment of FIG. 2, an inerting supply line 254 fluidly connects the fuel tank 202 to the evaporator container 210. After the inert gas 234 is generated, the inert gas 234 will flow through a fuel tank supply line 256 to supply the inert gas 234 to the fuel tank 202 and, optionally, additional fuel tanks 258.

Figure 3:
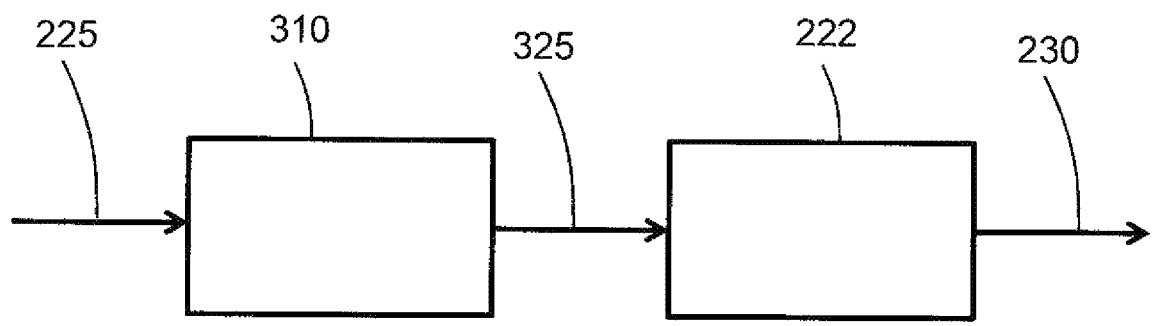
FIG. 3 is a schematic illustration of an adsorber/reactor portion of a fuel tank inerting system.

As mentioned above, the inerting system includes an adsorbent on the fuel flow path between the fuel tank 202 and the catalytic reactor 222 or on the reactive flow path in the catalytic reactor 222. The adsorbent can be located anywhere along the fuel flow path that extends from the fuel tank 202 through the evaporator 210 and mixer 224 to the catalytic reactor 222, or can be disposed along the reactive flow path in the catalytic reactor 222. FIG. 3 schematically depicts an example embodiment with an adsorbent immediately upstream of the catalytic reactor 222. As shown in FIG. 3, the mixed reactant stream 225 comprising air and vaporized fuel is introduced to an adsorbent module 310. The adsorbent module 310 includes an adsorbent that comprises a transition metal oxide or a metal organic framework. Transition metals for oxide adsorbents include manganese, copper, nickel, indium, cobalt, magnesium, aluminum, titanium, chromium or molybdenum. Examples of transition metal oxide adsorbents include manganese oxide (e.g., $MnO_2$), copper oxide (e.g., CuO), nickel oxide (e.g., NiO), cobalt oxide (e.g., $Co_2O_3$), magnesium oxide (e.g., MgO), and $TiO_2$ or mixed oxides comprising any of the foregoing (e.g., mixed copper-manganese oxide, mixed manganese-cerium oxide, mixed magnesium-aluminum oxide, mixed $MnO_2$—$CeO_2$, mixed $MnO_2$—$ZrO_2$). Many transition metal oxides having a physical configuration (e.g., surface area and porosity parameters) suitable for adsorption of molecular species such as catalyst poisons are commercially available. Transition metal oxides suitable for adsorption can be prepared, for example, by sol-gel techniques known to produce metal oxides having mesoporous (or micro or macroporous) structures that promote adsorptive functionality.

Metal-organic composite materials (i.e., a metal organic framework or "MOF") can also be utilized as adsorbents. Metal organic framework materials are can comprise metal ions or clusters of metal ions coordinated to organic ligands to form one-, two- or three-dimensional structures. Some metal organic frameworks can be characterized as a coordination network with organic ligands containing voids. Some coordination networks can include a coordination compound extending in at least one direction through repeating coordination entities, with cross-links between two or more individual chains, loops, or spiro-links, or coordination compounds extending in two or three dimensions. Coordination compounds can include coordination polymers with repeating coordination entities extending in one, two, or three dimensions. Examples of organic ligands include but are not limited to bidentate carboxylates (e.g., oxalic acid, succinic acid, phthalic acid isomers, etc.), tridentate carboxylates (e.g., citric acid, trimesic acid), azoles (e.g., 1,2,3-triazole), as well as other known organic ligands. Metal organic frameworks are further described by Batten, S R; Champness, N R; Chen, X-M; Garcia-Martinez, J; Kitagawa, S; Öhrström, L; O'Keeffe, M; Suh, M P; Reedijk, J (2013). "Terminology of metal-organic frameworks and coordination polymers (IUPAC Recommendations 2013)", Pure and Applied Chemistry. 85 (8): 1715. doi:10.1351/PAC-REC-12-11-2, the disclosure of which is incorporated herein by reference in its entirety.

Various metals can be included in a metal organic framework. In some embodiments, the metal organic framework comprises a transition metal, including but not limited to any of the transition metals described above with respect to transition metal oxide adsorbents. In some embodiments, the metal used in the metal organic framework has catalytic activity for removal of catalyst poisons or for catalyzing reaction of fuel and oxygen (e.g., Mn, Cu). In some embodiments, the MOF can include specific basic sites or metal oxide sites known to react with $SO_2$. Examples of specific metal organic framework materials include $Zn_4O_{13}C_{54}H_{24}$, $CuO_4C_6H_2$, UiO-66-$NH_2$ ({$Zr(bdc-NH_2)_2$} with (bdc-$NH_2$)=2-amino-1,4-benzenedicarboxylate)). MOF's can be synthesized by hydrothermal or solvothermal techniques, where crystals are slowly grown from a hot solution. Templating for the MOF structure can be provided by a secondary building unit (SBU) and the organic ligands. Alternate synthesis techniques are also available, such as chemical vapor deposition. Other materials can also be included in the adsorbent material or adsorbent module, such as other (non-transition metal) adsorbents (e.g., activated carbon), which can be used as a support for the transition metal oxide, or can be incorporated as a stand-alone component or as part of a composite material along with the transition metal oxide.

In some embodiments, the adsorbent can be can be supported (e.g., dispersed on a high surface area support such as γ-$Al_2O_3$, $TiO_2$, $SiO_2$, ceria, zirconia, zeolites or activated carbon). The adsorbent module 310 can further comprise a substrate structure such as ceramic or metallic monoliths, honeycombs, foams, fibers or corrugated support structures, onto which the adsorbent can be applied (e.g., as a wash coat).

In some embodiments, the adsorbent(s) can provide regeneration capability, and in some embodiments, the system controller is configured to activate a purge operation to regenerate the adsorbent by application of heat (e.g., temperatures of at least 60° C.) and/or a purge gas flow through the adsorbent module 310. In some embodiments, air or other oxygen-containing gas can be used with or without heat as a reactive purge gas to oxidatively regenerate the adsorbent. In some embodiments, the controller can be configured to activate a purge operation during a period of low inert gas demand (e.g., during taxi and ascent) when the reactor 222 can be inactive. In some embodiments, the controller can be configured to provide a service alert for a service technician to activate a purge operation during the next available service opportunity. In some embodiments, the controller can be configured to activate a purge operation during operation (e.g., by applying heat to the adsorbent). Heat for regeneration can be provided by a thermal connection (e.g., a heat conductive physical connection or a thermal connection through a heat transfer fluid, not shown) between the heat-generating catalytic reactor module 222 and the adsorbent module 310.

In some embodiments, the adsorbent material can have one or more physical parameters that promote adsorption of catalyst poisons, and optionally promote catalytic activity of the adsorbent material. In some embodiments, the adsorbent can have a BET surface area in a range having a lower endpoint of 40 m²/g, more specifically 50 m²/g, even more specifically 60 m²/g, and an upper even more specifically 200 m²/g, or an upper endpoint for MOF's of 1500 m²/g, more specifically 1200 m²/g, and even more specifically 1100 m²/g, or an upper endpoint for transition metal oxides of 300 m²/g and more specifically 200 m²/g. Any of the above lower and upper range endpoints can be combined to disclose a variety of different ranges. In some embodiments, the adsorbent can have an average pore size in a range having a lower endpoint of 1 nm and an upper endpoint of 3 nm, and a pore volume of less than or equal to 0.2 cm³/g.

With continued reference to FIG. 3, a treated reactant mixture 325 exits the adsorbent module 310 and is directed to the inlet of catalyst reactor 222. The catalyst reactor 222 catalytically reacts fuel and oxygen, and discharges an oxygen-depleted gas 230 from the outlet of catalyst reactor 222. It should be noted that although FIG. 3 depicts the adsorbent module 310 and the catalytic reactor module 222 as separate components, the modules can be integrated into a single device with a fluid flow path that contacts an adsorbent material and is then directed to a catalyst material. Similarly, although FIG. 3 depicts fluid flow moving directly from the adsorbent module 310 to the catalytic reactor 222, one or more fluid process devices or functionalities can be interposed between the adsorbent module 310 and the catalytic reactor 222. Additionally, the adsorbent module can be used to treat only one of the reactants, e.g., the fuel, which can be treated in liquid or vapor form.

In some embodiments, the transition metal oxide adsorbent can also provide catalytic activity for catalytic removal of catalyst poisons, or for catalytic reaction of the fuel and oxygen reactants. Examples of transition metal oxides having catalytic activity include $MnO_2$, $Co_2O_3$, $CuO$, $NiO$ and $MgO$. In some embodiments, the adsorbent can provide a technical effect of promoting effective reaction of fuel and air by a downstream catalyst such as a noble metal catalyst or metal oxide catalyst. In some embodiments, the adsorbent can provide an additional technical effect of catalyzing reaction of fuel and oxygen, either as a primary catalyst or to supplement the functionality of a downstream catalyst such as a noble metal catalyst.

As mentioned above, some adsorbents such as transition metal oxides can exhibit catalytic activity at certain temperature ranges, and accordingly, such materials can be utilized in an adsorbent module such as module 310, or can be incorporated the catalytic reactor 222 as a catalyst. In some embodiments, the catalytic reactor 222 includes one or more noble metal catalysts, either in addition to transition metal oxide catalyst(s) or as stand-alone catalyst(s). In some embodiments, a transition metal oxide catalyst can be used upstream (either in the catalytic reactor 222 along a reactive flow path between the reactor inlet and outlet) or in a separate reactor upstream of the reactor 222. As used herein, the term "noble metal" means a metal selected from ruthenium, rhodium, palladium, iridium, platinum, gold, silver, or combinations comprising any of the foregoing. In some embodiments, the noble metal is selected from palladium or platinum and their alloys. The noble metal can be dispersed in an oxide support such as $Al_2O_3$, $ZrO_2$, $TiO_2$ and $SiO_2$, and the catalyst (noble metal and oxide support) can be disposed on a carbon or ceramic substrate such as a honeycomb, corrugated sheet, fiber or other monolith structure. Ceramics for substrates can include but are not limited to sillimanite, petalite, cordierite, mullite, Zircon, Zircon mullite, spodumene, alumina, alumina-titanate, etc. Non-noble metal materials such as nickel, manganese, cobalt, copper, etc. (or oxides thereof) can also be included in the catalyst to promote additional catalytic reactivity.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fuel tank inerting system, comprising
   a fuel tank;
   a mixer arranged to receive fuel from the fuel tank and oxygen from an oxygen source;
   a catalytic reactor comprising an inlet, an outlet, a reactive flow path between the inlet and the outlet, and a catalyst on the reactive flow path, said catalytic reactor arranged to receive a mixture of fuel and oxygen from the mixer, and to catalytically react the mixture of the fuel and oxygen along the reactive flow path to generate an inert gas;
   an inert gas flow path from the catalytic reactor to the fuel tank; and
   an adsorbent disposed along a reactant flow path between the mixer and the catalytic reactor.

2. The fuel tank inerting system of claim 1, wherein the adsorbent comprises a transition metal oxide.

3. The fuel tank inerting system of claim 2, wherein the transition metal oxide comprises an oxide of manganese, copper, cobalt, magnesium, nickel, indium, or combinations comprising any of the foregoing.

4. The fuel tank inerting system of claim 1, wherein the adsorbent comprises a metal organic framework.

5. The fuel tank inerting system of claim 4, wherein the metal organic framework comprises a transition metal or transition metal oxide.

6. The fuel tank inerting system of claim 5, wherein the transition metal or oxide of a transition metal is selected from manganese, copper, cobalt, magnesium, nickel, indium, or combinations comprising any of the foregoing.

7. The fuel tank inerting system of claim 1, further comprising a thermal connection between the adsorbent and a heat source for regenerating the adsorbent.

8. The fuel tank inerting system of claim 1, further comprising a fluid connection between the adsorbent and an oxidizing source for regenerating the adsorbent.

9. The fuel tank inerting system of claim 1, wherein the catalyst comprises a noble metal catalyst.

10. A fueled vehicle including the fuel tank inerting system of claim 1.

* * * * *